United States Patent
Saulsbury

(10) Patent No.: US 6,892,295 B2
(45) Date of Patent: May 10, 2005

(54) PROCESSING ARCHITECTURE HAVING AN ARRAY BOUNDS CHECK CAPABILITY

(75) Inventor: Ashley Saulsbury, Los Altos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 784 days.

(21) Appl. No.: 09/802,196

(22) Filed: Mar. 8, 2001

(65) Prior Publication Data

US 2002/0029332 A1 Mar. 7, 2002

Related U.S. Application Data

(60) Provisional application No. 60/187,739, filed on Mar. 8, 2000.

(51) Int. Cl.[7] ................................................ G06F 7/02
(52) U.S. Cl. ........................ 712/223; 712/222; 712/227
(58) Field of Search ................................ 712/222, 223, 712/227

(56) References Cited

U.S. PATENT DOCUMENTS

| | | | |
|---|---|---|---|
| 4,542,456 A | | 9/1985 | Hill |
| 5,687,338 A | | 11/1997 | Boggs et al. |
| 5,900,011 A | | 5/1999 | Saulsbury et al. |
| 5,909,572 A | | 6/1999 | Thayer et al. |
| 5,933,650 A | | 8/1999 | van Hook et al. |
| 6,014,723 A | | 1/2000 | Tremblay et al. |
| 6,035,390 A | * | 3/2000 | Burns et al. ............... 712/220 |
| 6,085,208 A | * | 7/2000 | Oberman et al. ........... 708/205 |
| 6,128,702 A | | 10/2000 | Saulsbury et al. |

FOREIGN PATENT DOCUMENTS

| | | |
|---|---|---|
| EP | 0540155 A2 | 5/1993 |
| WO | WO 80/01423 A1 | 7/1980 |

OTHER PUBLICATIONS

"UltraSPARC™ The Visual Instruction Set (VIS™): On Chip Support for New–Media Processing," Sun Microsystems, Hardward & Networking, Microelectronics, White Paper, retrieved from the Internet: http://www.sun.com/microelectronics/whitepapers/ wp95–022, printed Jun. 04, 1999.

8XC251SB Embedded Microcontroller User's Manual, Order No. 272617–001, Intel, Feb. 1995, A1–A144.

Manual for M32000D3FP, Single Chip 32–BIT CMOS Microcomputer, Mitsubishi Microcomputers, Mitsubishi Electric, May 1998.

Subramania Sudharsanan, "MAJC–5200: A High Performance Microprocessor for Multimedia Computing," Sun Microsystems, Inc., Paul Alto, CA.

VIS™ Instruction Set User's Manual, Sun Microsystems, Inc., Palo Alto, CA, Mar. 2000.

VIS™ Instruction Set User's Manual, Sun Microsystems, Sun Microelectronics, Mountain View, CA, Part No.: 805–1394–01, Jul. 1997.

Ruby B. Lee, Hewlett–Packard, "Subword Parallelism with MAX–2," Aug. 1996 IEEE.

* cited by examiner

Primary Examiner—William M. Treat
(74) Attorney, Agent, or Firm—Townsend and Townsend and Crew LLP

(57) ABSTRACT

According to the invention, a method for processing data related to an array of elements is disclosed. In one embodiment, a method for processing data related to an array of elements is disclosed. In the process, a first value is loaded from a first location, and a second value is loaded from a second location. The first and second values are compared to each other. A predetermined value is optionally stored at a destination based upon the outcome of the comparison.

23 Claims, 8 Drawing Sheets

Unsigned 64 Data Type

Signed 64 Data Type

Unsigned 32 Data Type

Signed 32 Data Type

Unsigned 16 Data Type

Signed 16 Data Type

Unsigned 8 Data Type

PROCESSING ARCHITECTURE HAVING AN ARRAY BOUNDS CHECK CAPABILITY

CROSS-REFERENCES TO RELATED APPLICATIONS

This application claims the benefit of U.S. Provisional Application No. 60/187,739 filed on Mar. 8, 2000.

This application is being filed concurrently with related U.S. patent applications: Ser. No. 60/187,687, entitled "VLIW Computer Processing Architecture with On-chip DRAM Usable as Physical Memory or Cache Memory"; Ser. No. 60/187,902, entitled "VLIW Computer Processing Architecture Having a Scalable Number of Register Files"; Ser. No. 09/802,108, entitled "Computer Processing Architecture Having a Scalable Number of Processing Paths and Pipelines"; Ser. No. 60/187,796, entitled "VLIW Computer Processing Architecture with On-chip Dynamic RAM"; Ser. No. 60/187,738, entitled "Computer Processing Architecture Having the Program Counter Stored in a Register File Register"; Ser. No. 60/186,901, entitled "Processing Architecture Having Parallel Arithmetic Capability"; Ser. No. 09/802,196, entitled "Processing Architecture Having an Array Bounds Check Capability"; Ser. No. 09/802,020, entitled "Processing Architecture Having a Matrix Transpose Capability"; and, Ser. No. 60/187,651, entitled "Processing Architecture Having a Compare Capability"; all of which are incorporated herein by reference.

BACKGROUND OF THE INVENTION

The present invention relates generally to an improved computer processing instruction set, and more particularly to an instruction set having an array bounds check capability.

Computer architecture designers are constantly trying to increase the speed and efficiency of computer processors. For example, computer architecture designers have attempted to increase processing speeds by increasing clock speeds and attempting latency hiding techniques, such as data prefetching and cache memories. In addition, other techniques, such as instruction-level parallelism using VLIW, multiple-issue superscalar, speculative execution, scoreboarding, and pipelining are used to further enhance performance and increase the number of instructions issued per clock cycle (IPC).

Architectures that attain their performance through instruction-level parallelism seem to be the growing trend in the computer architecture field. Examples of architectures utilizing instruction-level parallelism include single instruction multiple data (SIMD) architecture, multiple instruction multiple data (MIMD) architecture, vector or array processing, and very long instruction word (VLIW) techniques. Of these, VLIW appears to be the most suitable for general purpose computing. However, there is a need to further achieve instruction-level parallelism through other techniques.

Certain programming languages, such as Java™, extensively utilize bounded array indexing. However, checking the array before performing the array access takes many instructions, which reduces code efficiency. With reference to FIG. 1, a flow diagram of a conventional method for checking and accessing the array is shown. In steps 100,104 and 108, three checks are performed in three separate branches. If any of these checks fail, a catch code routine is executed in step 112. However, if none of the checks fail, the memory offset for the index is computed and the array value is loaded in steps 116,118 and 120. As can be appreciated, checking and accessing the array in this way takes many instructions.

Although a VLIW processor may execute some branch sub-instructions in parallel, there are problems with a conventional VLIW implementation. As is discussed further below, the processing paths that execute individual sub-instructions have limited capability. For example, each processing path may not have the ability to process a branch sub-instruction. A scheduling mechanism is relied upon to route the sub-instruction to a processing path that can execute a branch sub-instruction. Accordingly, a VLIW implementation may execute the branch sub-instructions at different times in different instruction words.

Furthermore, avoiding stalls while executing branch sub-instructions requires non-branch dependent sub-instruction to follow the branch sub-instruction. If the branch sub-instructions are not part of the same instruction word, those skilled in the art appreciate that avoiding stalls becomes difficult. Accordingly, improved methods are needed for performing the array check and access.

SUMMARY OF THE INVENTION

The present invention performs a bounds check for an array in a way which increases code efficiency. In one embodiment, a method for processing data related to an array of elements is disclosed. In the process, a first value is loaded from a first location, and a second value is loaded from a second location. The first and second values are compared to each other. A predetermined value is optionally stored at a destination based upon the outcome of the comparison.

A more complete understanding of the present invention may be derived by referring to the detailed description of preferred embodiments and claims when considered in connection with the figures, wherein like reference numbers refer to similar items throughout the figures.

DESCRIPTION OF THE SPECIFIC EMBODIMENTS

Introduction

The present invention provides a computer processor chip having an instruction that performs a bounds check for an array in a way which increases code efficiency. If the bounds check fails, branch code is executed to resolve any problems. As one skilled in the art will appreciate, increasing the power of an instruction increases the instructions issued per clock cycle (IPC). For example, the array can be checked and accessed in two instruction words of a two-way VLIW processor which is considerably more efficient than convention methods.

In the Figures, similar components and/or features have the same reference label. Further, various components of the same type are distinguished by following the reference label by a dash and a second label that distinguishes among the similar components. If only the first reference label is used in the specification, the description is applicable to any one of the similar components having the second label.

Processor Overview

Figure 1:
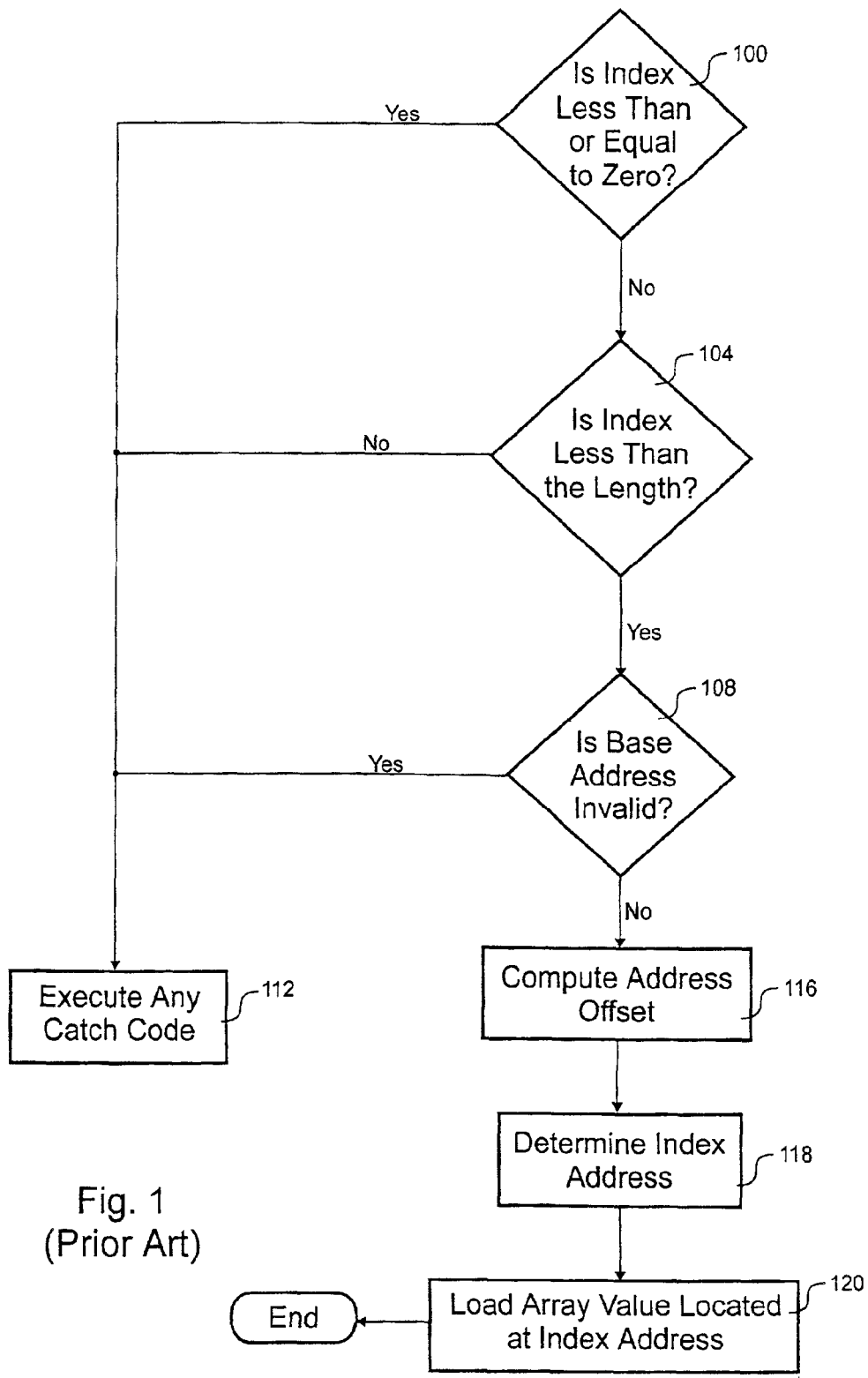
FIG. 1 is a flow diagram of an embodiment that checks and performs a bounded array access in a conventional manner.
Figure 2:
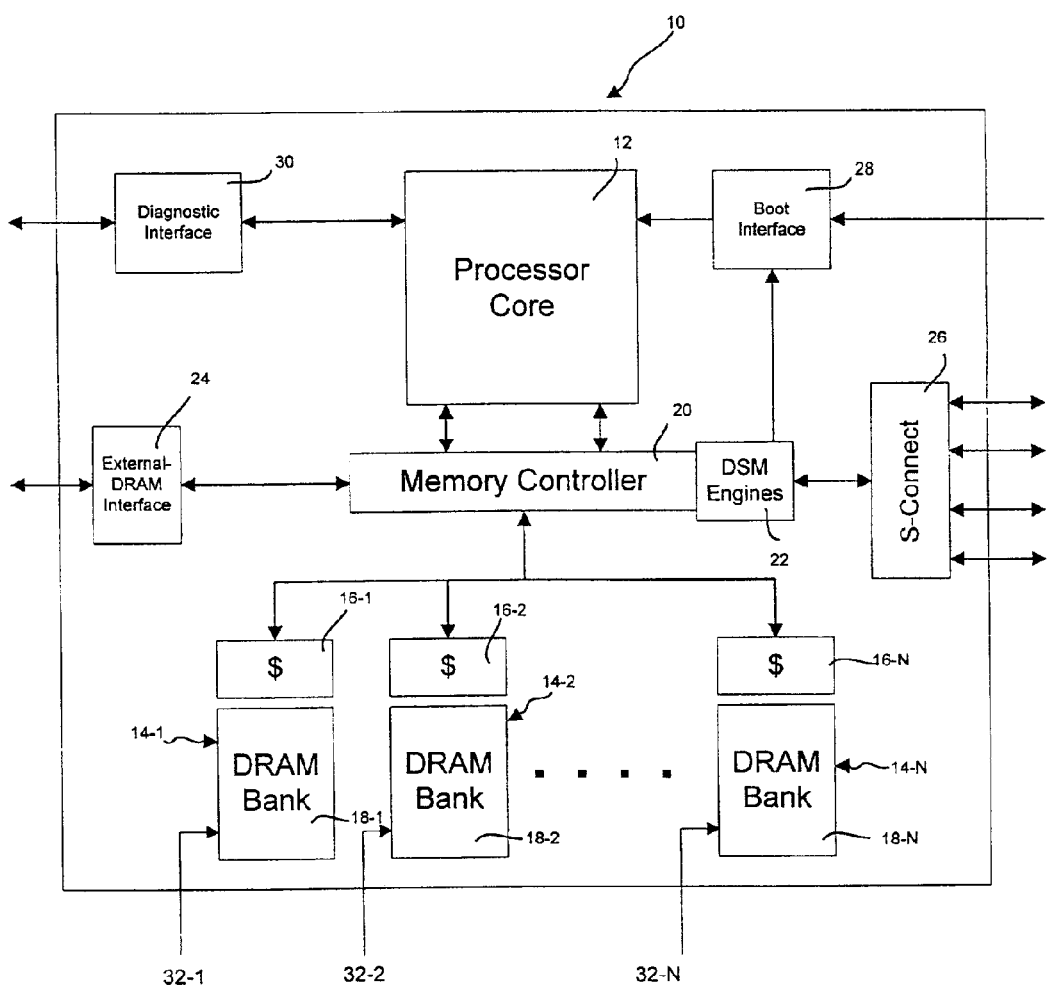
FIG. 2 is a block diagram of an embodiment of a processor chip having the processor logic and memory on the same integrated circuit.

With reference to FIG. 2, a processor chip 10 is shown which embodies the present invention. In particular, processor chip 10 comprises a processing core 12, a plurality of memory banks 14, a memory controller 20, a distributed shared memory controller 22, an external memory interface 24, a high-speed I/O link 26, a boot interface 28, and a diagnostic interface 30.

As discussed in more detail below, processing core 12 comprises a scalable VLIW processing core, which may be configured as a single processing pipeline or as multiple processing pipelines. The number of processing pipelines typically is a function of the processing power needed for the particular application. For example, a processor for a personal workstation typically will require fewer pipelines than are required in a supercomputing system.

In addition to processing core 12, processor chip 10 comprises one or more banks of memory 14. As illustrated in FIG. 2, any number of banks of memory can be placed on processor chip 10. As one skilled in the art will appreciate, the amount of memory 14 configured on chip 10 is limited by current silicon processing technology. As transistor and line geometries decrease, the total amount of memory that can be placed on a processor chip 10 will increase.

Connected between processing core 12 and memory 14 is a memory controller 20. Memory controller 20 communicates with processing core 12 and memory 14, and handles the memory I/O requests to memory 14 from processing core 12 and from other processors and I/O devices. Connected to memory controller 20 is a distributed shared memory (DSM) controller 22, which controls and routes I/O requests and data messages from processing core 12 to off-chip devices, such as other processor chips and/or I/O peripheral devices. In addition, as discussed in more detail below, DSM controller 22 is configured to receive I/O requests and data messages from off-chip devices, and route the requests and messages to memory controller 20 for access to memory 14 or processing core 12.

High-speed I/O link 26 is connected to the DSM controller 22. In accordance with this aspect of the present invention, DSM controller 22 communicates with other processor chips and I/O peripheral devices across the I/O link 26. For example, DSM controller 22 sends I/O requests and data messages to other devices via I/O link 26. Similarly, DSM controller 22 receives I/O requests from other devices via the link.

Processor chip 10 further comprises an external memory interface 24. External memory interface 24 is connected to memory controller 20 and is configured to communicate memory I/O requests from memory controller 20 to external memory. Finally, as mentioned briefly above, processor chip 10 further comprises a boot interface 28 and a diagnostic interface 30. Boot interface 28 is connected to processing core 12 and is configured to receive a bootstrap program for cold booting processing core 12 when needed. Similarly, diagnostic interface 30 also is connected to processing core 12 and configured to provide external access to the processing core for diagnostic purposes.

Processing Core

1. General Configuration

As mentioned briefly above, processing core 12 comprises a scalable VLIW processing core, which may be configured as a single processing pipeline or as multiple processing pipelines. A single processing pipeline can function as a single pipeline processing one instruction at a time, or as a single VLIW pipeline processing multiple sub-instructions in a single VLIW instruction word. Similarly, a multi-pipeline processing core can function as multiple autonomous processing cores. This enables an operating system to dynamically choose between a synchronized VLIW operation or a parallel multi-threaded paradigm. In multi-threaded mode, the VLIW processor manages a number of strands executed in parallel.

In accordance with one embodiment of the present invention, when processing core 12 is operating in the synchronized VLIW operation mode, an application program compiler typically creates a VLIW instruction word comprising a plurality of sub-instructions appended together, which are then processed in parallel by processing core 12. The number of sub-instructions in the VLIW instruction word matches the total number of available processing paths in the processing core pipeline. Thus, each processing path processes VLIW sub-instructions so that all the sub-instructions are processed in parallel. In accordance with this particular aspect of the present invention, the sub-instructions in a VLIW instruction word issue together in this embodiment. Thus, if one of the processing paths is stalled, all the sub-instructions will stall until all of the processing paths clear. Then, all the sub-instructions in the VLIW instruction word will issue at the same time. As one skilled in the art will appreciate, even though the sub-instructions issue simultaneously, the processing of each sub-instruction may complete at different times or clock cycles, because different sub-instruction types may have different processing latencies.

In accordance with an alternative embodiment of the present invention, when the multi-pipelined processing core is operating in the parallel multi-threaded mode, the program sub-instructions are not necessarily tied together in a VLIW instruction word. Thus, as instructions are retrieved from an instruction cache, the operating system determines which pipeline is to process each sub-instruction for a strand. Thus, with this particular configuration, each pipeline can act as an independent processor, processing a strand independent of strands in the other pipelines. In addition, in accordance with one embodiment of the present invention, by using the multi-threaded mode, the same program sub-instructions can be processed simultaneously by two separate pipelines using two separate blocks of data, thus achieving a fault tolerant processing core. The remainder of the discussion herein will be directed to a synchronized VLIW operation mode. However, the present invention is not limited to this particular configuration.

2. Very Long Instruction Word (VLIW)

Figure 3:
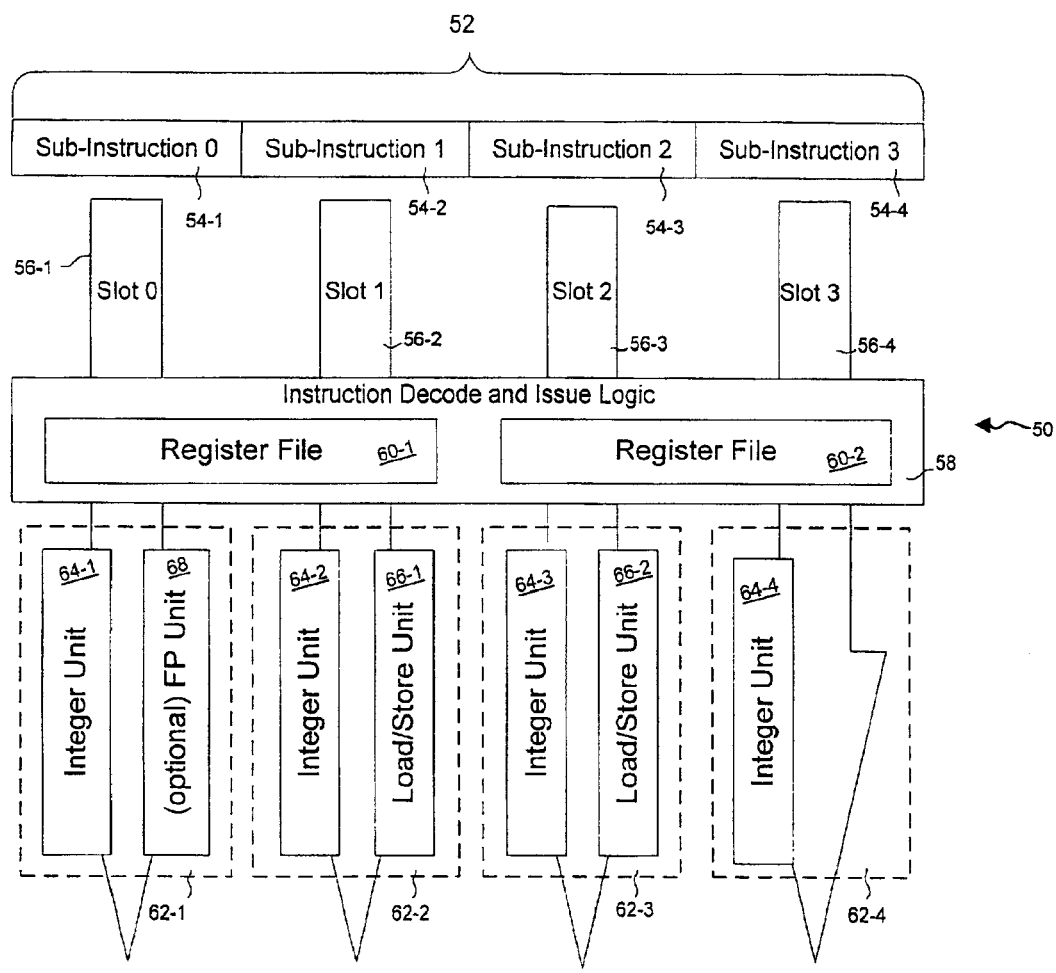
FIG. 3 is block diagram illustrating one embodiment of a processing core having a four-way VLIW pipeline design.

Referring now to FIG. 3, a simple block diagram of a VLIW processing core pipeline 50 having four processing paths, 56-1 to 56-4, is shown. In accordance with the illustrated embodiment, a VLIW 52 comprises four RISC-like sub-instructions, 54-1, 54-2, 54-3, and 54-4, appended together into a single instruction word. For example, an instruction word of one hundred and twenty-eight bits is divided into four thirty-two bit sub-instructions. The number of VLIW sub-instructions 54 correspond to the number of processing paths 56 in processing core pipeline 50. Accordingly, while the illustrated embodiment shows four sub-instructions 54 and four processing paths 56, one skilled in the art will appreciate that the pipeline 50 may comprise any number of sub-instructions 54 and processing paths 56. Typically, however, the number of sub-instructions 54 and processing paths 56 is a power of two.

Each sub-instruction 54 in this embodiment corresponds directly with a specific processing path 56 within the pipeline 50. Each of the sub-instructions 54 are of similar format and operate on one or more related register files 60. For example, processing core pipeline 50 may be configured so that all four sub-instructions 54 access the same register file, or processing core pipeline 50 may be configured to have multiple register files 60. In accordance with the illustrated embodiment of the present invention, sub-instructions 54-1 and 54-2 access register file 60-1, and sub-instructions 54-3 and 54-4 access register file 60-2. As those skilled in the art can appreciate, such a configuration can help improve performance of the processing core.

As illustrated in FIG. 3, an instruction decode and issue logic stage 58 of the processing core pipeline 50 receives VLIW instruction word 52 and decodes and issues the sub-instructions 54 to the appropriate processing paths 56. Each sub-instruction 54 then passes to the execute stage of pipeline 50 which includes a functional or execute unit 62 for each processing path 56. Each functional or execute unit 62 may comprise an integer processing unit 64, a load/store processing unit 66, a floating point processing unit 68, or a combination of any or all of the above. For example, in accordance with the particular embodiment illustrated in FIG. 3, the execute unit 62-1 includes an integer processing unit 64-1 and a floating point processing unit 68; the execute unit 62-2 includes an integer processing unit 64-2 and a load/store processing unit 66-1; the execute unit 62-3 includes an integer processing unit 64-3 and a load/store unit 66-2; and the execute unit 62-4 includes only an integer unit 64-4.

As one skilled in the art will appreciate, scheduling of sub-instructions within a VLIW instruction word 52 and scheduling the order of VLIW instruction words within a program is important so as to avoid unnecessary latency problems, such as load, store and writeback dependencies. In accordance with the one embodiment of the present invention, the scheduling responsibilities are primarily relegated to the software compiler for the application programs. Thus, unnecessarily complex scheduling logic is removed from the processing core, so that the design implementation of the processing core is made as simple are possible. Advances in compiler technology thus result in improved performance without redesign of the hardware. In addition, some particular processing core implementations may prefer or require certain types of instructions to be executed only in specific pipeline slots or paths to reduce the overall complexity of a given device. For example, in accordance with the embodiment illustrated in FIG. 3, since only processing path 56-1, and in particular execute unit 62-1, include a floating point processing unit 68, all floating point sub-instructions are dispatched through path 56-1. As discussed above, the compiler is responsible for handling such issue restrictions in this embodiment.

In accordance with a one embodiment of the present invention, all of the sub-instructions 54 within a VLIW instruction word 52 issue in parallel. Should one of the sub-instructions 54 stall (i.e., not issue), for example due to an unavailable resource, the entire VLIW instruction word 52 stalls until the particular stalled sub-instruction 54 issues. By ensuring that all sub-instructions within a VLIW instruction word 52 issue simultaneously, the implementation logic is dramatically simplified.

3. Data Types

The registers within the processor chip are arranged in varying data types. By having a variety of data types, different data formats can be held in a register. For example, there may be different data types associated with signed integer, unsigned integer, single-precision floating point, and double-precision floating point values. Additionally, a register may be subdivided or partitioned to hold a number of values in separate fields. These subdivided registers are operated upon by single instruction multiple data (SIMD) instructions.

Figure 4:
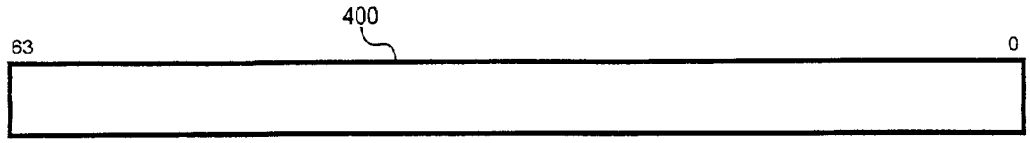
FIG. 4 is a diagram showing some data types generally available to the processor chip.
Figure 4:
Figure 4:
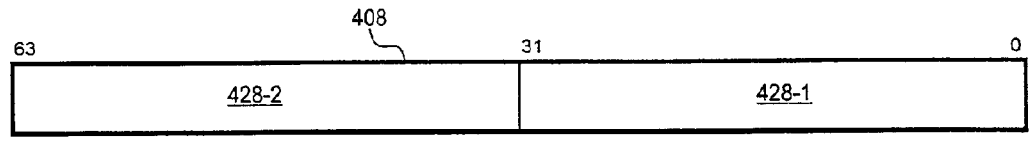
Figure 4:
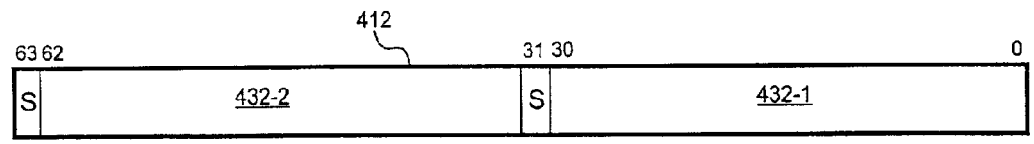
Figure 4:
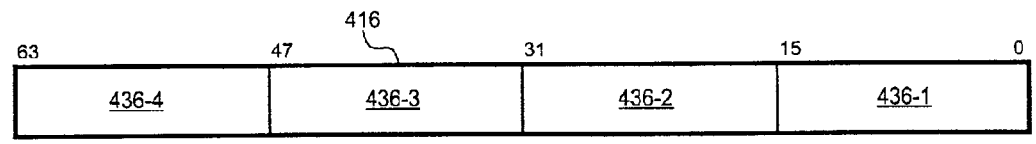
Figure 4:
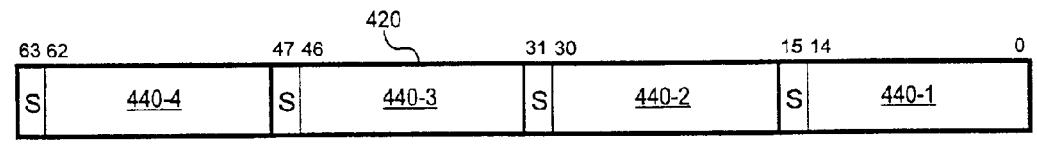
Figure 4:
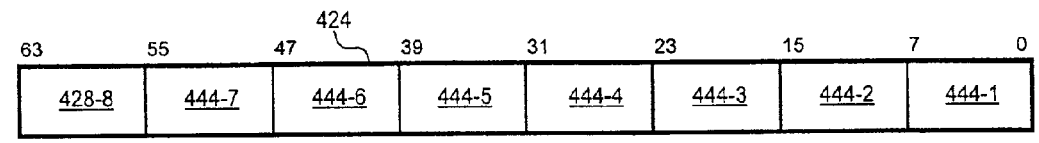

With reference to FIG. 4, some of the data types available for the sub-instructions are shown. Although there are a number of different data types, a given sub-instruction 54 may only utilize a subset of these. For example, this embodiment of the bounds check operation only utilizes the various unpartitioned data types 400, 404 that hold only one operand. However, other embodiments of the bounds check function could use partitioned data types. In this embodiment, the bounds check function uses operands which are sixty-four bits wide and unsigned which corresponds to the unsigned 64 data type 400. As those skilled in the art appreciate, there are other possible data types and this invention is not limited to those depicted in FIG. 4.

4. Bounds Check Instruction

Figure 5:
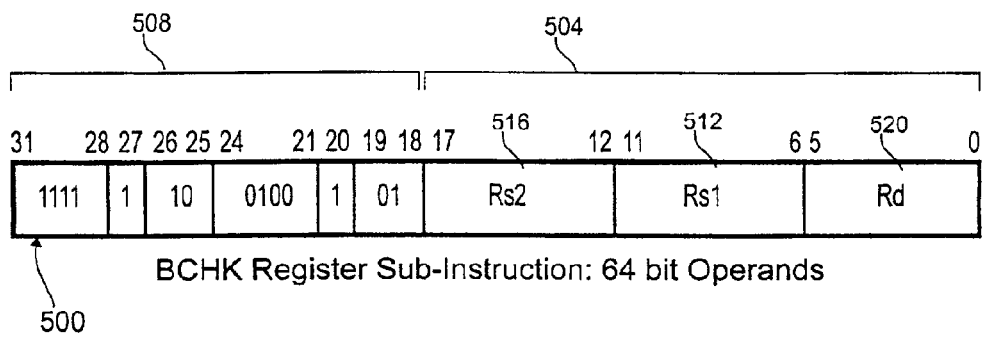
FIG. 5 is a diagram showing an embodiment of machine code syntax for a bounds check sub-instruction.

Referring next to the embodiment of FIG. 5, the machine code for a bounds check sub-instruction ("BCHK") 500 is shown. This variation of the sub-instruction addressing forms is generally referred to as the register addressing form 500. The sub-instruction 500 is thirty-two bits wide such that a four-way VLIW processor, with an one hundred and twenty-eight bit wide instruction word 52, can accommodate execution of four sub-instructions 500 at a time. The sub-instruction 500 is divided into an address and op code portions 504, 508. Generally, the address portion 504 contains the information needed to load and store the operators, and the op code portion 508 indicates which function to perform upon the operators.

The register addressing form 500 of the sub-instruction utilizes three registers. A first and second source addresses 512, 516 are used to load a first and second source registers which respectively contain the first and second operands. A destination address 520 is used to indicate where to store the result into a destination register. Since each register 512, 516, 520 is addressed with six bits, sixty-four registers are possible in an on-chip register file 60. In this embodiment, all loads and stores are performed with the on-chip register file 60. However, other embodiments could allow addressing registers outside the processing core 12. Bits 31-18 of the register form 500 of the sub-instruction are the op codes 508 which are used by the processing core 12 to execute the sub-instruction 54. Various sub-instruction types have different amounts of bits devoted to op codes 508.

Typically, a compiler is used to convert assembly language or a higher level language into machine code that contains the op codes. As is understood by those skilled in the art, the op codes control multiplexors, other combinatorial logic and registers to perform a predetermined function. Furthermore, those skilled in the art appreciate there could be many different ways to implement op codes.

5. Bounds Check Implementation

Figure 6:
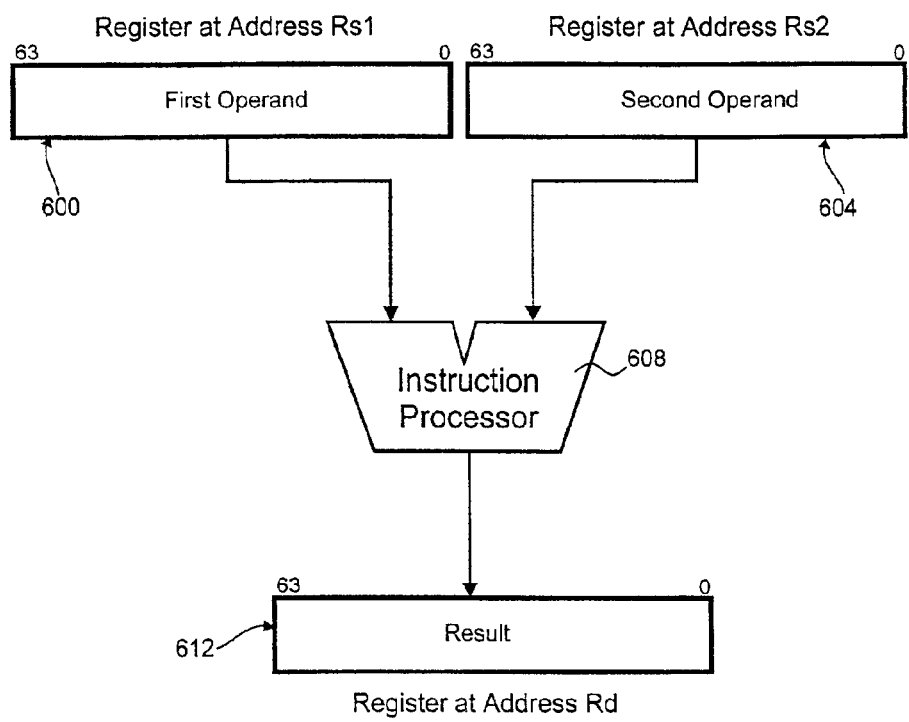
FIG. 6 is a block diagram that schematically illustrates one embodiment of a bounds check function performed upon two source registers.

With reference to FIG. 6, a block diagram of one embodiment of the bounds check function is shown. In this embodiment, the bounds check function includes a first source register 600, a second source register 604, an instruction processor 608, and a destination register 612. The first source register 600 includes a first operand and the second source register 604 includes a second operand. In this embodiment, each of the source registers and destination register utilizes the unsigned 64 data type 400.

The instruction processor 608 performs the bounds check function. As discussed above, the op code of the sub-instruction controls which operands are loaded into the instruction processor 608 and how the operands are processed. Processing begins by loading the operands from each source register 600, 604. After processing is completed, the results are stored in the destination register 612. As discussed further below, the instruction processor 608 either writes an invalid value to the destination register or does nothing based upon an analysis of the source operands. Although not shown, those skilled in the art appreciate there is circuitry which allows selecting the various registers in the register file 60 which hold the source operands and destination results.

To understand the bounds check function, the terminology used in array manipulation is explained. An array is a linear list of like elements arranged in consecutive order where an index is used to point to various elements in the array. More specifically, the array contains a number of elements ("N") located at array indexes ("I") zero through N−1 where the array length is also equal to N. A base address ("M") indicates where in memory the array is stored. Since the array elements are stored in memory as bytes, an array element having a width larger than one byte may occupy a number of memory bytes. To determine the address of an indexed element under this circumstance, an address offset is calculated and added to the base address. For example, if the array elements are sixty-four bits wide, eight bytes of memory are required for each array element word. If the base address (M) is equal to sixty-four and the index (I) is equal to three, the address of the indexed element (i.e., the index address) is sixty-four plus three times eight or eighty-eight (M+8I). As those skilled in the art appreciate, the array index, array size and address offset are typically positive integers.

The bounds check sub-instruction ("BCHK") operates on an array index and length to determine if an array index value is valid. The array index is valid if it is greater than or equal to zero and less than the array length. In the BCHK sub-instruction, the first operand is the array length value and the second operand is the array index value.

For a valid array, the base address must also be valid. As can be appreciated, there are certain addresses in the memory space that are invalid or otherwise reserved. For example, the address of zero is an invalid base address.

Figure 7:
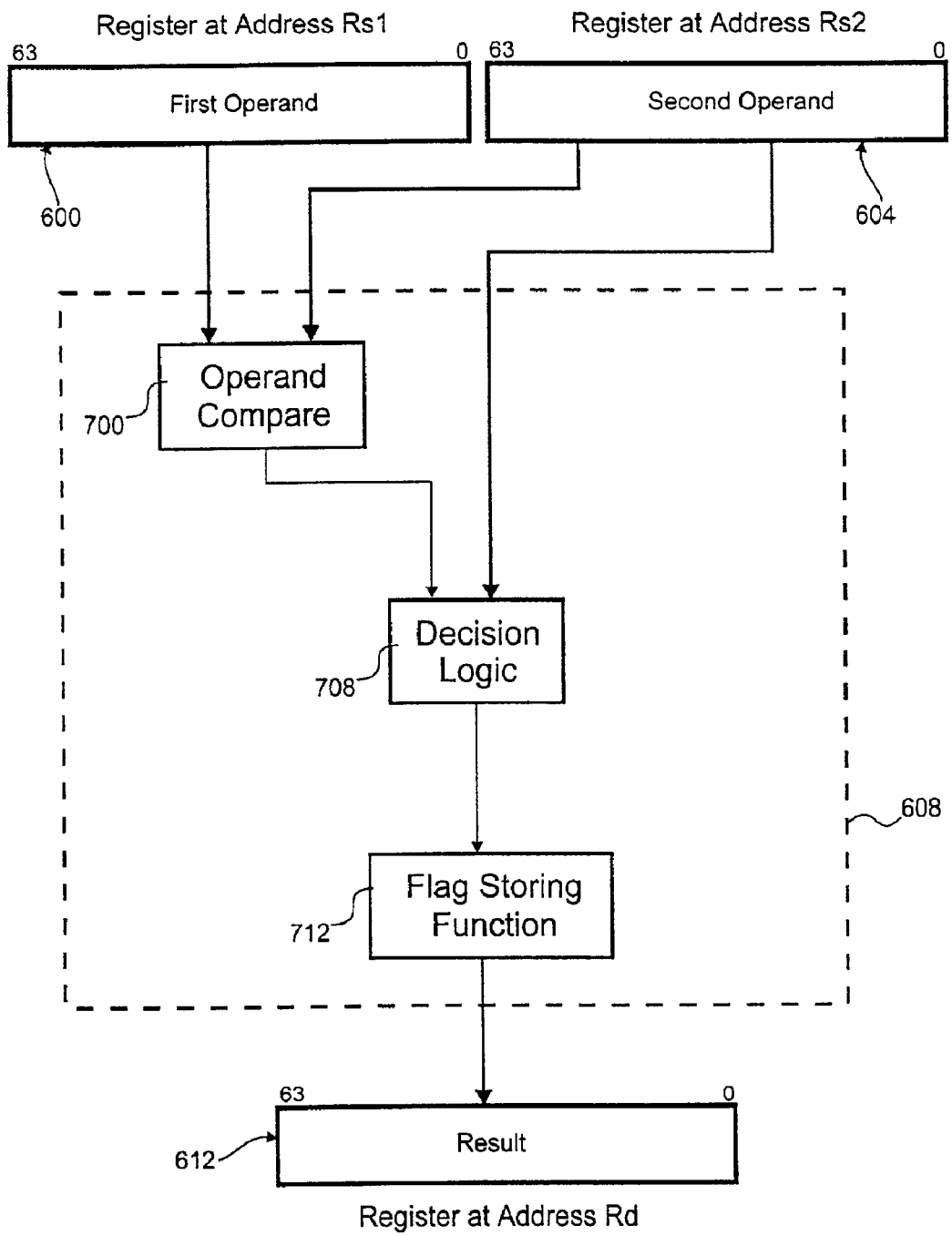
FIG. 7 is a block diagram that schematically illustrates the bounds check function of FIG. 6 in more detail.

Referring next to FIG. 7, a block diagram of portions of the processing core is shown that depicts the instruction processor 608 of FIG. 6 in greater detail. The instruction processor 608 includes an operand compare function 700, decision logic 708, and a flag store function 712. These blocks work in concert to perform the bounds check function. Those skilled in the art can appreciate, determining if the second operand or array index is greater than or equal to zero is unnecessary in this embodiment, since the data type is an unsigned 64 data type 400. By definition, unsigned values are greater than or equal to zero.

The operand compare function 700 determines if the second operand or array index is less than the first operand or array length. As those skilled in the art know, there are many ways to implement this function. For example, the operand compare function 700 could subtract the array length from the array index. A negative result would indicate the array index is less than the array length.

Once the array length is subtracted from the array index, the decision logic 708 determines if the result is negative. A negative number indicates the array index is less than the array length. Further, a negative number means the index is valid. Where the index is valid, the sub-instruction takes no other action that effectively makes the sub-instruction perform no operation (i.e., a "no op"). However, if the index is invalid, a signal is sent to the flag storing function 712 that indicates the same.

If the flag storing function 712 receives notification from the decision logic 708 that the index is invalid, the storing function writes an invalid base address to the destination register 612. As mentioned above, there are base addresses that point to an invalid memory address, for example, an address of zero. In this embodiment, an invalid base address of zero is written to the destination register 612 when the decision logic 708 determines the array index is invalid.

Figure 8:
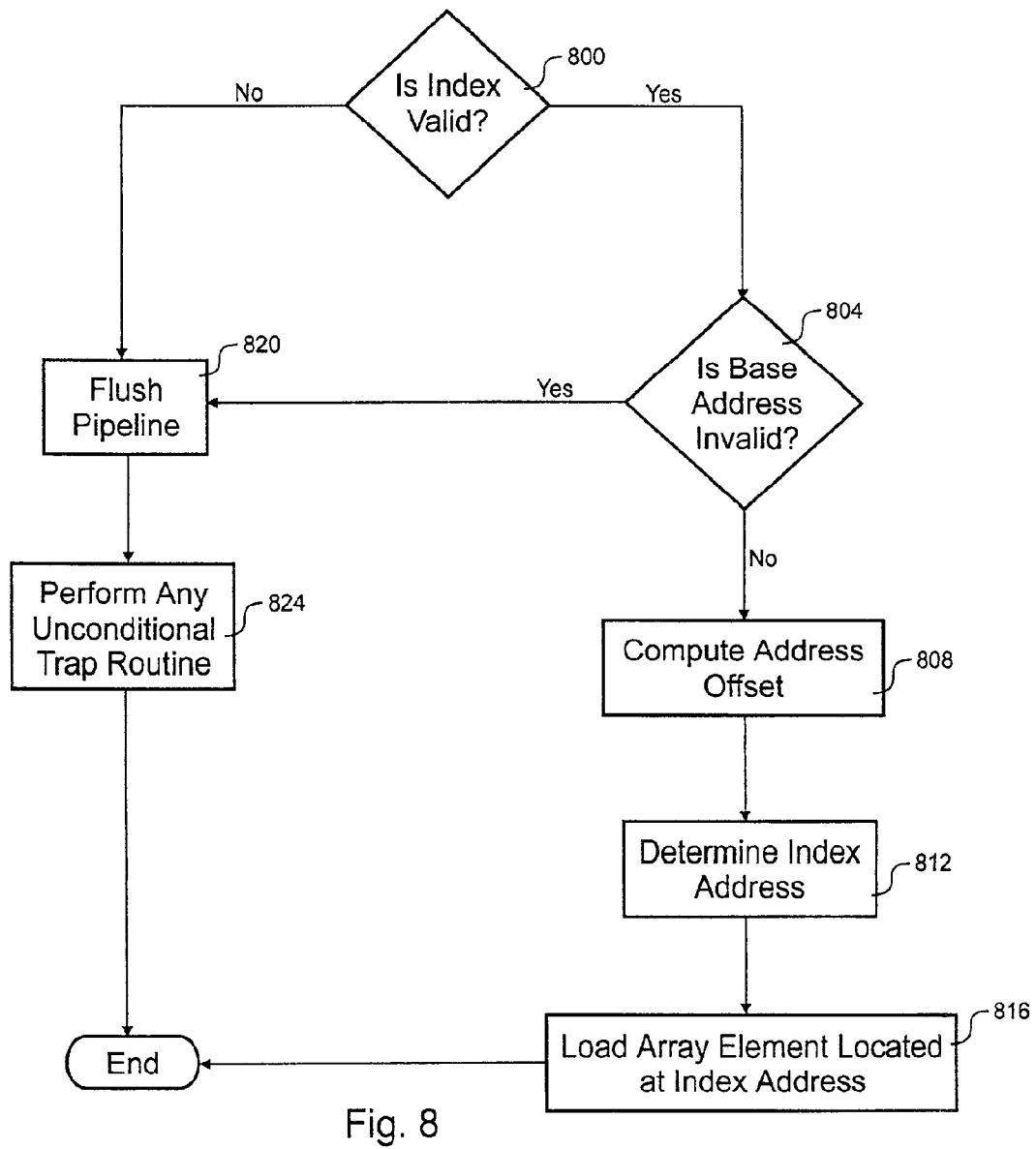
FIG. 8 is a flow diagram showing one embodiment a method for performing a bounds check which may result in an unconditional trap.

With reference to FIG. 8, a flow diagram is shown which illustrates an embodiment of a method for validating an array and performing an access to that array. If the index or base address is determined invalid, an unconditional trap is performed. Otherwise, the index address is calculated and the element at that location is loaded.

In steps 800 and 804, checks are performed upon the array before loading the array element. The array index value is checked in step 800 to determine if it is both greater than or equal to zero and less than the array length. This step is performed by a single bounds check sub-instruction ("BCHK"). If the index is determined valid, a further validity determination is made on the base address in step 804. The base address is invalid if it point to one or more illegal addresses, such as zero.

Once the above steps determine the array index value and base register are valid, the indexed array element is loaded. First, an address offset is computed in step 808. For example, if array elements are eight bytes wide, the array index would be multiplied by eight to determine the address offset. Next in step 812, the index address is determined by adding the address offset to the base address. Once the index address is known, the array element is loaded in step 816.

If either the array index or the base address is determined invalid, in steps 800 and 804, a trap to the operating system occurs. A trap is a exception condition where a privileged bit is set to invoke a special handler routine which is normally part of the operating system. In step 820, the pipeline 50 of the processing core 12 is flushed to remove any partially executed sub-instructions. For example, if the trap is initiated in the fifth stage of the pipeline of a four-way VLIW processing core, the preceding sixteen sub-instructions are flushed. After flushing the pipeline 50, any unconditional trap routine is executed in step 824. If the trap routine recovers from the trap and begins execution at the point where the trap was initiated, the flushed sub-instructions must be reloaded and processed. As those skilled in the art can appreciate, avoiding execution of an unconditional trap improves code efficiency.

Figure 9:
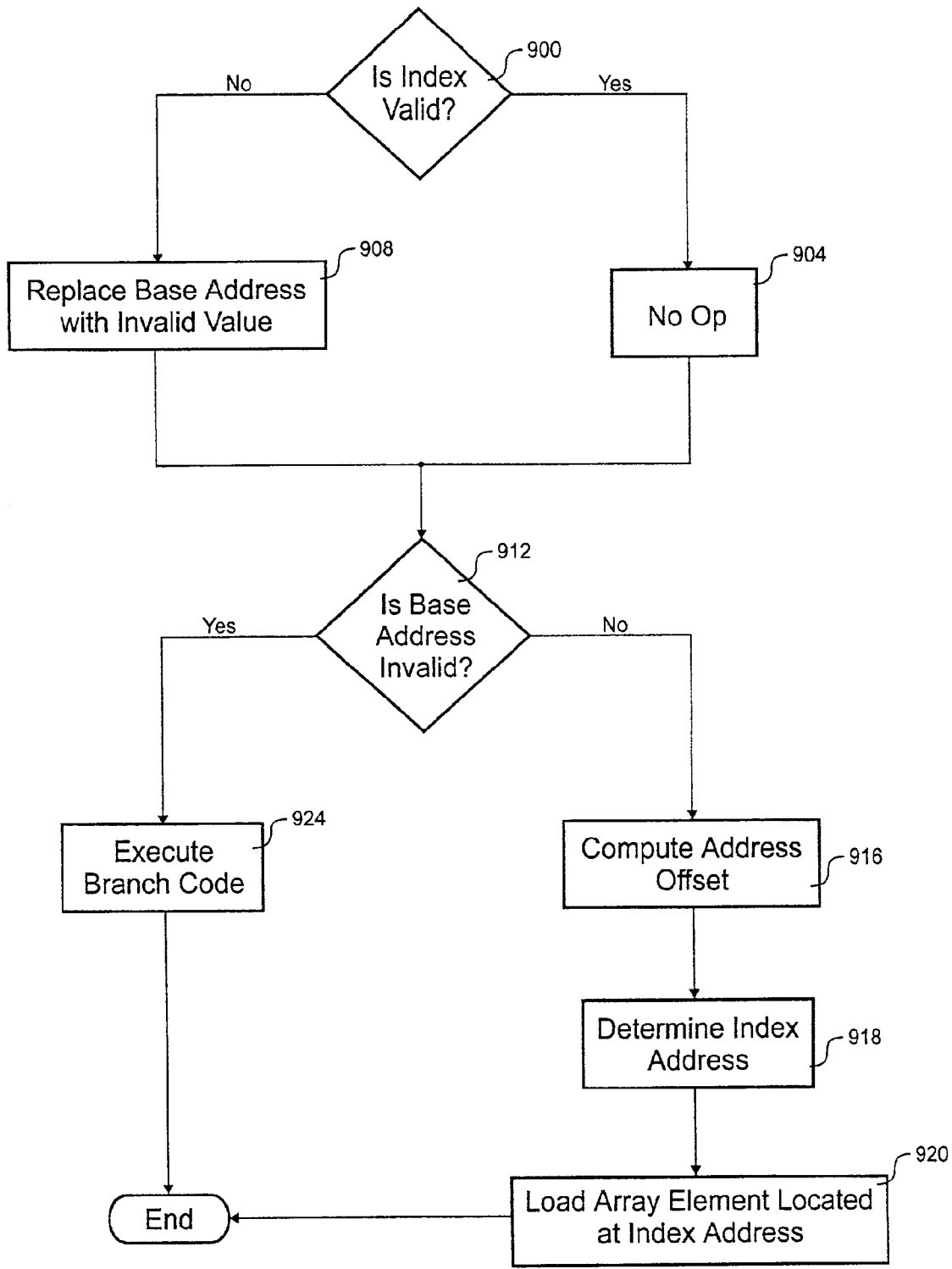
FIG. 9 is a flow diagram illustrating another embodiment of a method for performing a bounds check which avoids use of an unconditional trap.

Referring next to FIG. 9, another embodiment of a method for validating and performing an array access is illustrated. This embodiment uses an improved bounds check sub-instruction that increases the efficiency of the code generation. Unlike the embodiment of FIG. 8, the bounds check sub-instruction sets a flag which indicates a invalid array index and does not initiate an unconditional trap.

In steps 900, 904 and 908, the bounds check sub-instruction is performed. In step 900, the validity of the index is determined. Valid indexes are in the range between zero and the array length minus one (i.e., $0 \leq I < N$). If the index is valid, no result is stored after executing the sub-instruction, which effectively renders the sub-instruction a no op. However, if the index is invalid, an invalid address is stored as the base register in step 908. Storing the invalid value serves as a flag that indicates the array access should not be performed.

In step 912, the base address is loaded and analyzed to determine if the base address is valid. An invalid base address could result from either an invalid value being passed to the software or step 908 storing an invalid value. If the base address is invalid, branch code that reacts to the problem is loaded in step 924. The branch typically does not trigger an unconditional trap, which would flush the pipeline 50. However, if the base address is valid, the index address is calculated and the array value is loaded in steps 916, 918 and 920.

With reference to the sole table, an embodiment of assembly language instructions is shown which checks the array and performs a load. The table shows two instruction words where the top word is executed before the bottom word. Each instruction word contains two sub-instructions that issue simultaneously.

| Two-way VLIW Instruction Word | |
|---|---|
| Second Sub-Instruction | First Sub-Instruction |
| BCHK arry_length, arry_index, base_addr; | ADDx8 arry_index, 0, addr_offset |
| SPLD [base_addr + addr_offset], element; | BREQ base_addr, branch_code |

The BCHK sub-instruction of the first word performs a bounds check to determine if the array index ("arry_index") is a value from zero to the value of the array length ("arry_length") minus one. If the arry_index is invalid, zero is written to the base address ("base_addr"). As part of the same issue, the ADDx8 sub-instruction scales the arry_index by eight and adds zero to formulate the address offset ("addr_offset"). The SPLD sub-instruction performs a speculative load of the index address calculated by adding the base_addr to addr_offset and stores the result ("element") into a destination register. As part of the second instruction word, a conditional branch if equal to zero ("BREQ") sub-instruction is performed. The BREQ sub-instruction branches to branch code ("branch_code") if base_addr is equal to zero. If it were equal to zero, the SPLD sub-instruction would not be needed and any result would return an undefined result which would not cause an exception. In this way, an array access is validated and accessed in two instruction words with a two-way VLIW processing core.

CONCLUSION

In conclusion, the present invention provides a bounds check function which allows increasing code efficiency. While a detailed description of presently preferred embodiments of the invention is given above, various alternatives, modifications, and equivalents will be apparent to those skilled in the art. For example, while the embodiment of the processing core discussed above uses unsigned operands, other embodiments could use signed values. Additionally, data types with operands of different sized could be used in addition to the sixty-four bit operands used in the above embodiment. Furthermore, this bounds check instruction can use a single issue or superscaler architecture and does not require a VLIW type architecture. Therefore, the above description should not be taken as limiting the scope of the invention that is defined by the appended claims.

What is claimed is:

1. A method for processing data in a processor with an instruction, wherein the data is related to an array of elements, the method comprising steps of:

loading a lint value from a first location;

loading a second value from a second location;

comparing the first and second values to each other to determine if an array index is valid;

storing a predetermined value in a destination register based upon the comparing step if the array index is invalid, wherein the preceding four steps are caused by the instruction.

2. The method for processing data in the processor with the instruction, wherein the data is related to the array of elements as recited in claim 1, wherein:

the first location and second location are source registers.

3. The method for processing data in the processor with the instruction, wherein the data is related to the array of elements as recited in claim 1, wherein the first and second values are operands.

4. The method for processing data in the processor with the instruction, wherein the data is related to the array of elements as recited in claim 1, wherein the predetermined value is zero.

5. The method for processing data in the processor with the instruction, wherein the data is related to the array of elements as recited in claim 1, wherein the comparing step comprises determining if the array index is greater than or equal to zero and less than a length of the array.

6. The method for processing data in the processor with the instruction, wherein the data is related to the array of elements as recited in claim 1, wherein the destination register includes a base address for the array.

7. The method for processing data in the processor with the instruction, wherein the data is related to the array of elements as recited in claim 1, wherein the storing step further includes setting a flag.

8. The method for processing data in the processor with the instruction, wherein the data is related to the array of elements as recited in claim 1, wherein:

the first location includes a length of the array the second location includes an index of the array.

9. The method for processing data in the processor with the instruction, wherein the data is related to the array of elements as recited in claim 1, wherein at least one of the first location, the second location and the destination register include a base address for the array.

10. The method for processing data in the processor with the instruction, wherein the data is related to the array of elements as recited in claim 1, wherein the predetermined value in the destination register indicates that a base address for the array is invalid.

11. The method for processing data in the processor with the instruction, wherein the data is related to the array of elements as recited in claim 1, wherein the destination register is left unchanged if the array index is valid.

12. An instruction processor that operates upon a first source register having a first operand and a second source register having operand, comprising:
- an operand compare function which compares the first and second operands, wherein the first and second operands include an array index for an array;
- decision logic coupled to the operand compare function which determines if the array index is greater than or equal to a beginning address of the array; and
- a flag setting function coupled to the decision logic, wherein setting function affects a stored base address for the array.

13. The instruction processor that operates upon the first source register having the first operand and the second source register having the second operand of claim 12, wherein the flag setting function stores a zero in a destination register.

14. The instruction processor that operates upon the first source register having the first operand and the second source register having the second operand of claim 12, wherein the operand compare function loads the first and second operands respectively from a first and second source registers.

15. The instruction processor that operates upon the first source register having the first operand and the second source register having the second operand of claim 12, wherein the flag setting function is coupled to a destination register that includes the stored base address for the array.

16. A method for processing an array by a processor, the method comprising the steps of:
- determining if an array index is valid;
- replacing a base address with a predetermined value based upon results from the determining if an array index is valid step; and
- determining if a base address of the array is valid.

17. The method for processing the array by the processor of claim 16, further comprising the step of loading a first and second very long instruction words, where each includes a plurality of sub-instructions.

18. The method for processing the array by the processor of claim 17, wherein the first and second very long instruction words accomplish the determining steps and a step of loading an array element at an index address.

19. The method for processing the array by the processor of claim 16, wherein the predetermined value is an invalid base address.

20. The method for processing the array by the processor of claim 16, further including the step of calculating an address offset.

21. The method for processing the array by the processor of claim 16, further including the step of adding an address offset to the base address.

22. The method for processing the array by the processor of claim 16, wherein the predetermined value is zero.

23. The method for processing the array by the processor of claim 16, wherein the step of determining if any index is valid includes the steps of:
- determining if the array index is with a range from zero to an array length minus one; and
- determining if the array index is less than the array length.

* * * * *

UNITED STATES PATENT AND TRADEMARK OFFICE
CERTIFICATE OF CORRECTION

PATENT NO.    : 6,892,295 B2
DATED         : May 10, 2005
INVENTOR(S)   : Ashley Saulsbury It is certified that error appears in the above-identified patent and that said Letters Patent is hereby corrected as shown below:

Column 10,
Line 17, "lint value" should read -- first value --

Column 11,
Line 7, "register having operand" should read -- register having a second operand --
Line 15, "wherein setting function" should read -- wherein the flag setting function --

Column 12,
Line 28, "any index" should read -- array index --

Signed and Sealed this

Twelfth Day of July, 2005

JON W. DUDAS
*Director of the United States Patent and Trademark Office*